United States Patent [19]

Amano et al.

[11] Patent Number: 4,573,859
[45] Date of Patent: Mar. 4, 1986

[54] APPARATUS FOR UNLOADING CURED TIRES FROM A TIRE VULCANIZING PRESS

[75] Inventors: Itaru Amano; Yoshimata Maikuma, both of Kobe; Keiji Ozaki, Hyogo; Hisaaki Ohnishi, Kobe, all of Japan

[73] Assignee: Kabushiki Kaisha Kobe Seiko Sho, Kobe, Japan

[21] Appl. No.: 470,949

[22] Filed: Mar. 1, 1983

[30] Foreign Application Priority Data

Mar. 2, 1982 [JP] Japan .................................. 57-34165

[51] Int. Cl.⁴ ............................................. B65G 61/00
[52] U.S. Cl. ....................................... 414/628; 425/38; 100/218; 414/222; 414/589
[58] Field of Search .................... 414/628, 222–225, 414/589, 590; 100/218; 425/32, 38

[56] References Cited

U.S. PATENT DOCUMENTS 4,013,186 3/1977 Barton et al. ...................... 414/628

Primary Examiner—Terrance L. Siemens
Attorney, Agent, or Firm—Oblon, Fisher, Spivak, McClelland & Maier

[57] ABSTRACT

An apparatus for unloading a cured tire from a tire vulcanizing press, said apparatus including a tire support member tiltably mounted on a liftable support member; a mechanism for moving the tire support member horizontally toward and away from the center forming mechanism of the tire curing press for receiving and unloading a cured tire; a mechanism for tilting the tire support member toward a tire discharging side of the press at a lifted position over the center forming mechanism thereof; and a guide cam member fixedly located in association with the lifted tilting position of the tire support member for guiding the same toward a lower tire discharge point in a predetermined tilted posture.

15 Claims, 9 Drawing Figures

APPARATUS FOR UNLOADING CURED TIRES FROM A TIRE VULCANIZING PRESS

BACKGROUND OF THE INVENTION

1. Field of the Invention

This invention relates to an apparatus for unloading cured tires from a tire vulcanizing press, and more particularly to a tire unloading apparatus which is capable of unloading cured tires in a smooth and secure manner without causing shocks or deformations thereto and which is constructed in a compact form to minimize the moving space required for the unloading operation.

2. Description of the Prior Art

There have been proposed and known in the art various kinds of tire unloaders for removing cured tires from a tire curing press. The known tire unloaders are largely classified into a type which is arranged to advance ejecting arms toward the center of the press to support and tilt a cured tire toward the discharging side and to throw it rearwardly, and a type which is arranged to support and carry a cured tire in a horizontal posture for discharging the same rearwardly. The former tilting and throwing type has a drawback in that the thrown tire sometimes fails to drop at a predetermined point, in addition to the problems connected with accuracy, including difficulty in centering the tire accurately especially in case the tire has to be set on a post inflator or the like in a succeeding stage. Besides, large and heavy tires are susceptible to the problems of deformation or distortion due to the large shocks which are imposed when the tires are dropped on a stopper mechanism immediately after curing. In the case of the latter horizontal transfer type, the tires have to be moved vertically before and after transferring them horizontally into and out of the curing press in order to evade the tire forming mechanism, consequently requiring a large installation space in both horizontal and vertical directions. Obviously, in this case a large unloading mechanism has to be provided, enlarging the size of the tire-vulcanizing press as a whole and inviting problems regarding cost versus performance.

SUMMARY OF THE INVENTION

The object of the present invention is elimination of the above-mentioned problems or difficulties of the prior art. More particularly, it is an object of the present invention to provide a compact and simplified mechanism for unloading cured tires from a tire vulcanizing press.

It is a more specific object of the present invention to provide an apparatus for unloading cured tires from a tire vulcanizing press, employing guide cam members for guiding the movement of a tire support member from a lifted tire-receiving position to a lower tire discharging level.

According to the present invention, the abovementioned objectives are achieved by a tire unloading apparatus which basically comprises a tire support member tiltably mounted on a liftable support member; means for moving the tire support member horizontally toward and away from the center forming mechanism of the tire curing press for receiving and unloading a cured tire; means for tilting the tire support member toward a tire discharging side of the press at a lifted position over the center forming mechanism thereof; and a guide cam member fixedly located in association with the lifted tilting position of the tire support member for guiding the same toward a lower tire discharge point in a predetermined tilted posture.

The above and other objects, features and advantages of the present invention will become apparent from the following description and appended claims, taken in conjunction with the accompanying drawings which show by way of example some preferred embodiments of the invention.

BRIEF DESCRIPTION OF THE INVENTION

DETAILED DESCRIPTION OF PREFERRED EMBODIMENTS

Figure 1:
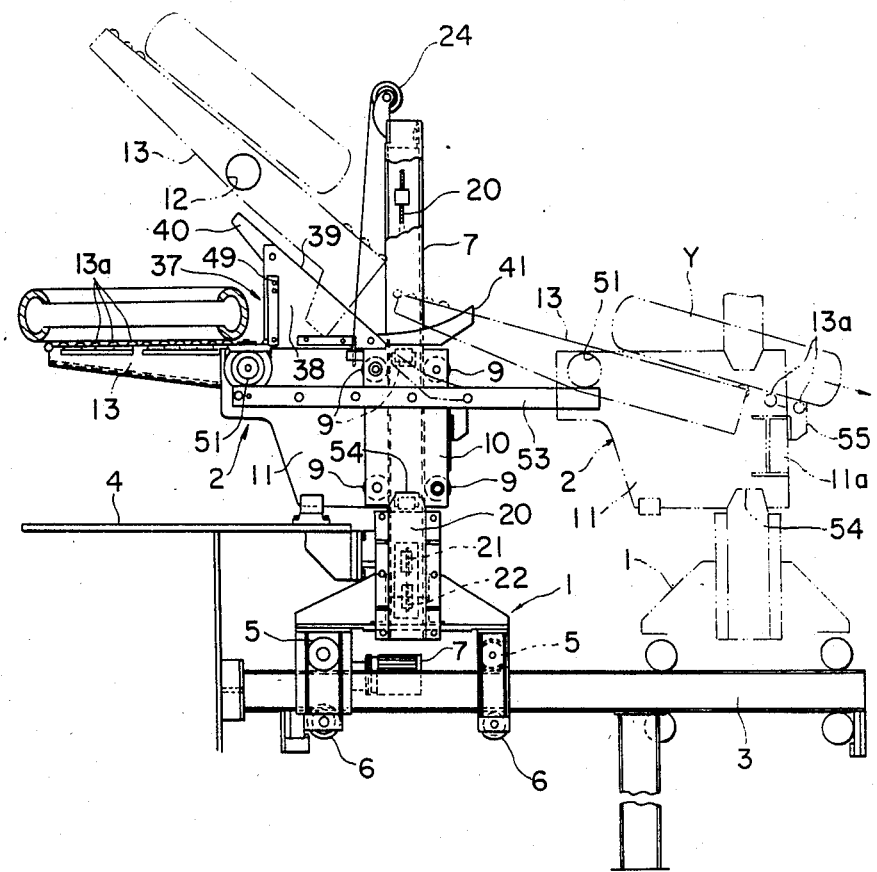
FIG. 1 is a general front view of a large-size tire vulcanizing press incorporating the unloading apparatus according to the present invention.

Referring to FIGS. 1 to 7, there is shown the tire unloading apparatus of the present invention, intended for a large-size tire vulcanizing press which can handle large tires weighing up to about 1000 kg. In FIG. 1, line X—X is the center line of the tire vulcanizing press (not shown). As is well known in the art, the tire vulcanizing press has a fixed lower mold section mounted on top of a base 4 through a heating plate, the lower mold section being centrally provided with a resilient shaping member which is generally referred to as "bladder" and a center mechanism for expanding and contracting the shaping member. An upper mold section, which is opposingly mounted to the lower mold section and releasably clamped to the latter by a press mechanism including a crank gear, side link and top link, is also provided with a heating plate along with means for feeding steam or other pressurized heating medium into the aforementioned resilient shaping member and means for feeding the pressurized heating medium into a dome which circumvents the upper and lower mold sections. In a manner well known in the art, after setting a green tire on the stationary lower mold section and fitting the resilient shaping member around the inner surface of the tire, a pressurized heating medium is introduced into the shaping member to initiate interior shaping of the tire while the movable upper mold section is closed and clamped against the lower mold section, curing the tire to shape through heating of the upper and lower mold sections and elevation of pressure of the heating medium in the resilient shaping member. Since the tire vulcanizing press itself may be of conventional construction in the present invention, its illustration is omitted in the various figures of the accompanying drawings.

According to the present invention, a pair of rails 3 are provided contiguously to one end of a base 4 on one side of a tire vulcanizing press, and a carriage 1 is mounted on the rails 3 so as to be movable toward and away from the press with its wheels 5 and guide rollers 6 in engagement with the upper and lower sides of the rails 3. The carriage 1 is advanced or receded along the center line X—X of the curing press by means of a motor 7 which is mounted on part of the carriage 1. A pair of guide posts 8 are erected on the outer sides of the rails 3 of the carriage 1 in parallel relation with each other to vertically movably support therebetween a arm lift assembly 2 which constitutes a main mechanism of the unloading apparatus of the present invention.

As illustrated in greater detail in FIGS. 1, 2, 4 and 5, the arm lift assembly 2 is supported on a bridge member 11 with sliders 10 which are slidably fitted on the guide post 8 through a number of rollers 9. Unloading arms 13 are pivotally mounted on an arm shaft 12 which is supported on and extended along the front end of the bridge member 10 for radially supporting opposite portions of the lower side of cured tire Y. A series of idle slide rollers 13a are provided on each arm 13 for ensuring smooth sliding movement of the tire Y.

Figure 2:
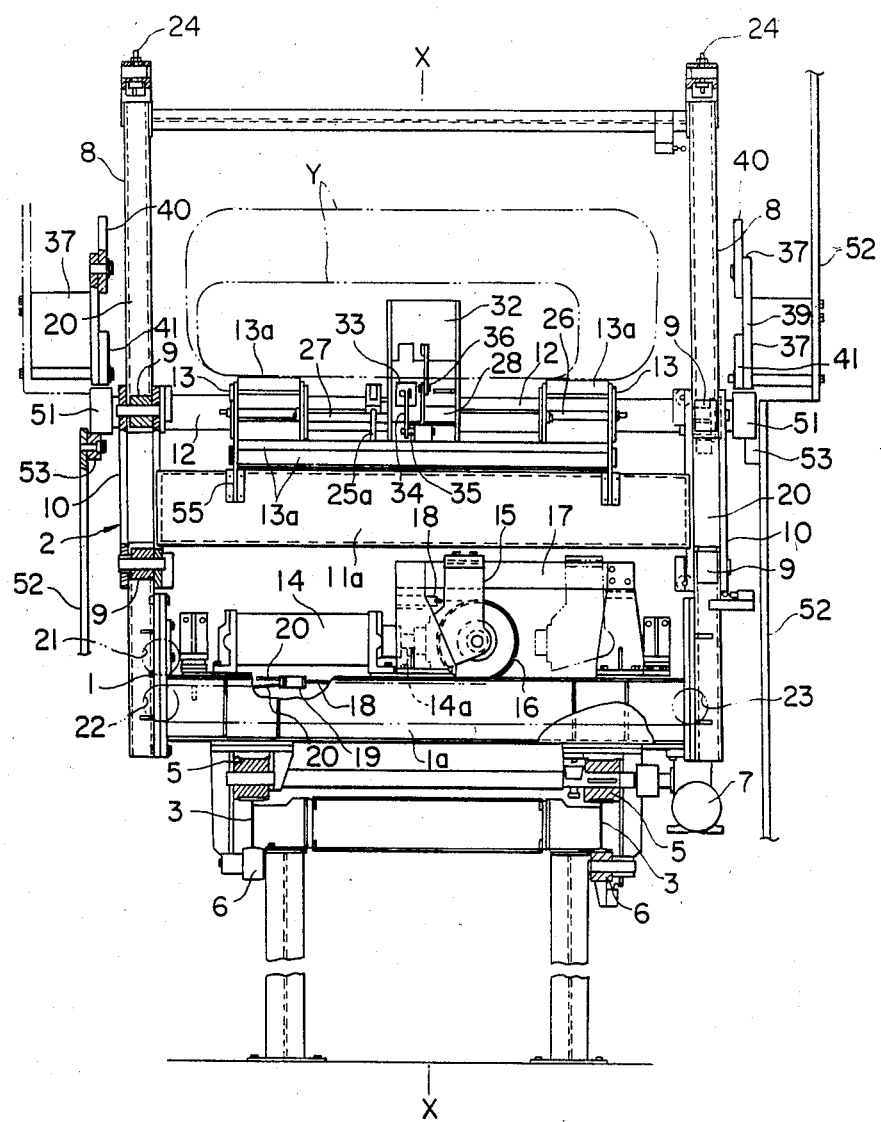
FIG. 2 is a side view of the same tire unloading apparatus.

The arm lift assembly 2 and unloading arms 13 which are supported as a whole on the carriage 1 are moved toward the center of the tire vulcanizing press by the advancement of the carriage 1 to receive a cured tire Y on the unloading arms 13. After lifting the tire Y by elevation of the arm lift assembly 2, the unloading arms 13 are inclined at the elevated point and lowered to discharge the tire from the press under the guidance of a guide cam member which will be described in greater detail hereinafter. For elevating the arm lifter 2 on the guide posts 8 and tilting the unloading arms 13 in this manner, the present invention employs the following mechanisms. Namely, in order to elevate the arm lift assembly 2, a drive cylinder 14 is mounted on a beam 1a of the carriage 1 which supports the guide posts 8, as shown in FIGS. 1 and 2. A sprocket wheel 16 on a slide 15 which is attached to a piston rod 14a of the cylinder 15 and slidably suspended from a guide 17, and applying around the sprocket 16 a chain 18 which has one end thereof fixed by the use of the guide 17. The other end of the chain 18 is connected through a joint 19 to a pair of chains 20 which are passed into the opposite guide posts 8 via sprocket wheels 21, 22 and 23 and fixed to the opposite ends of the bridge member 11 through sprocket wheels 24 which are provided at the upper ends of the guide posts 8. Consequently, extension and retraction of the piston rod 14a of the drive cylinder 14 are accompanied by back and forth movements of the slide 15 and sprocket wheel 16 between the positions indicated by solid and broken lines in FIG. 2, advancing or retracting the chain 18 as well as chains 20 to shift the bridge member 11 downwardly or upwardly along the guide posts 8 through the sliders 10 thereby lowering or elevating the arm lift assembly 2 and unloading arms 13. Of course, there may be employed other lift mechanisms to this effect.

Figure 4:
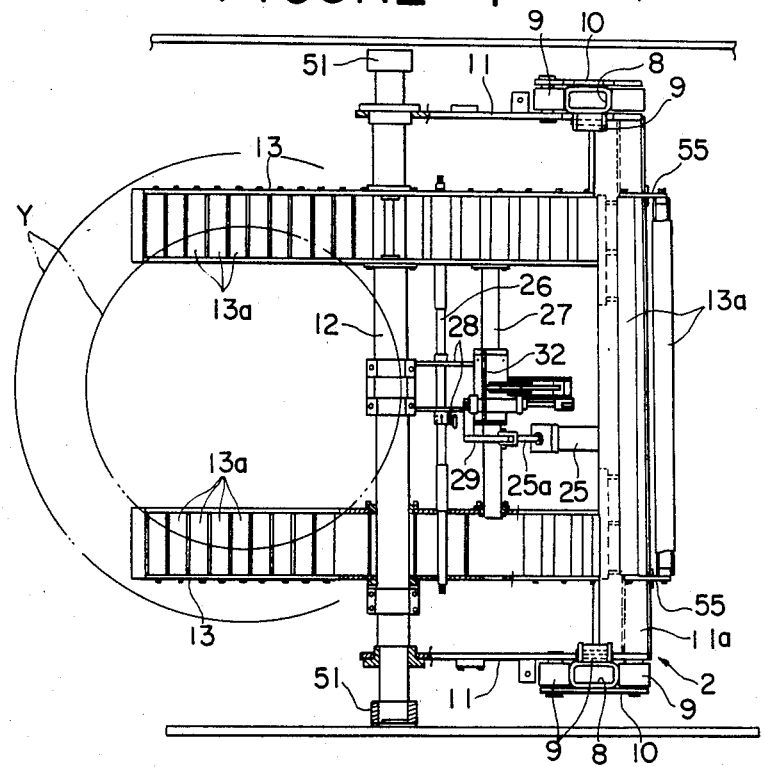
FIG. 4 is a plan view of tire unloading arms of the unloading apparatus.
Figure 5:
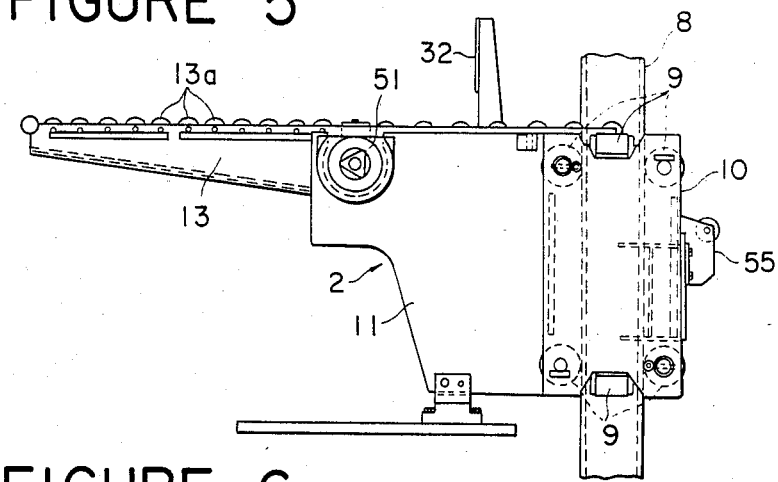
FIG. 5 is a side view of the tire unloading apparatus.
Figure 6:
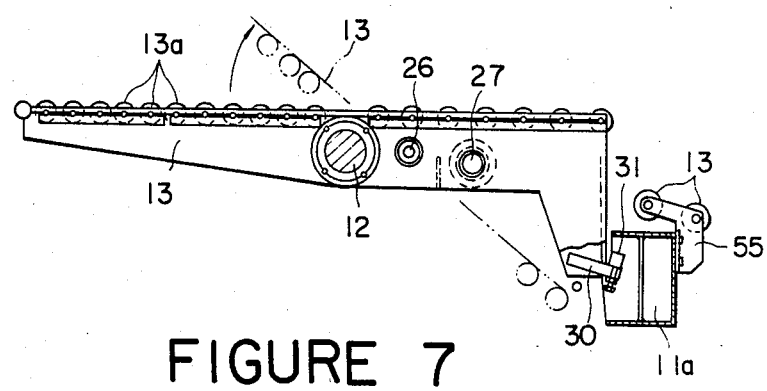
FIG. 6 is a partly sectioned side view of the tire unloading apparatus.
Figure 7:
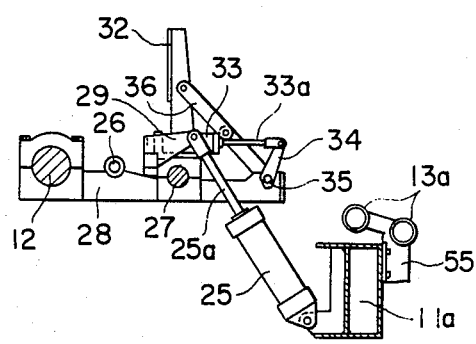
FIG. 7 is a side view of a tire stopper mechanism.

For turning the arms 13 into inclined positions, a drive cylinder 25 is mounted on a beam 11a of the bridge member 11 which is exemplified in FIGS. 2 and 4 to 6 and partly in FIG. 7, with the piston rod 25a of the cylinder 25 being connected to an operating link 29 which is attached to three parts, i.e. the arm shaft 12 transversely supported on the part of the bridge member 11 through the unloading arms 13, a connecting shaft 26 supported between the arms 13 at a position rearward of the arm shaft 12, and a fixed bar 27 extending between the inner sides of the unloading arms 13 at a position behind the connecting shaft 26, as shown in FIGS. 4 and 7. The operating link 29 is located over the fixed bar 27 as shown particularly in FIG. 7. Provided in the lower portions at the rear ends of the unloading arms 13 is a stopper 30 for engagement with an opposingly located stopper 31 which is provided on the part of the beam 11a of the bridge member 11, as shown in FIG. 6, to thereby retain the unloading arms 13 in horizontal positions. Consequently, the unloading arms 13 are normally held in horizontal positions on the bridge member 11 as shown in FIGS. 6 and 7, and, if the rod 25a of the drive cylinder 25 is retracted downwardly in FIG. 7, the bracket 28 as a whole is rocked downwardly about the arm shaft 12 along with the connecting shaft 26 and bar 27 to tilt the unloading arms 13 toward the discharging side as indicated in phantom lines in FIG. 6 and then into the positions also indicated in phantom lines in FIG. 1 to assume a tilt-back posture at an angle of, for example, 40 degrees.

Upon tilting the arms 13, the tire Y which is supported on the arms 13 is also tilted and tends to move in the tilted direction. In order to block free movement of the tire Y, the unloader of the present invention is provided with a foldably projected stopper member 32 on the bracket 28 which is mounted on the arm shaft 12, connecting shaft 26 and fixed bar 27 as shown particularly in FIGS. 2, 4 and 7. More specifically, the stopper 32 is pivotally supported on the fixed bar 27 and connected to a piston rod 33a of a drive cylinder 33 through a link 34 which has one end thereof pivotally connected to the piston rod 33a of the drive cylinder 33 and the other end connected to the bracket 28, and a foldable link 36 which has its opposite ends pivotally connected to the pivoting shaft 35 of the operating link 34 and the stopper 32, respectively, as shown in FIG. 7. As the piston rod 33a is extended outwardly or retracted inwardly by operation of the cylinder 33, the foldable link 36 is stretched through rocking movements of the operating link 34 to raise the stopper 32 into the upright position as shown in FIG. 7. When the link 36 is folded, the stopper 32 is turned into a flat position, disengaging from the tire Y. Needless to say, it is easy for one skilled in the art to employ other mechanisms for slanting unloading arms 13 and turning the stopper 32 into and out of the operating position.

Figure 3:
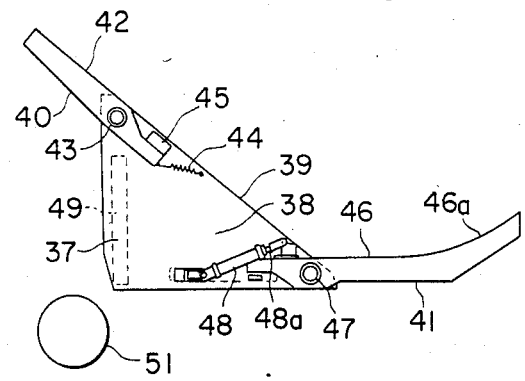
FIG. 3 is a front view of a guide cam member.

In combination with the above-described mechanisms for supporting and unloading cured tires Y, the present invention includes a guide cam member 37 which is, in the particular embodiment shown in FIG. 3, constituted by a main cam plate 38 of a substantially right-angled triangular shape, and auxiliary cam plates 40 attached to the upper and lower ends of the inclined slide surface of a predetermined angle which is provided on the main cam plate 38. The auxiliary cam plate 40 at the upper end is provided with an inclined slide surface 42 in conformity with the inclined slide surface 39 of cam plate 38, and rockably supported on a pivoting shaft 43 for rocking movement relative to the main cam plate 38. The upper auxiliary cam plate 40 is biased in one direction to restore a predetermined position by means of a spring 44 and a stopper 45 and is rockable to avoid interference with the movement of the arm lift assembly 2 when the latter is elevated as will be described in greater detail hereinbelow. The lower auxiliary cam plate 41 is provided with a curved guide surface 46a at the fore end of a straight slide surface 46 which can be brought into alignment with the inclined slide surface 39, and rockably supported on a pivoting shaft 47 for rocking movement relative to the main cam plate 38. The auxiliary cam plate 41 is connected to a piston rod 48a of a drive cylinder 48 and thereby rocked about the pivoting shaft 47 into and out of a raised position. As illustrated in FIG. 2, a pair of guide cam members 37 are opposingly positioned on the outer sides of the bridge member 11 of the arm lift assembly 2 to guide the bridge member 11. The aforementioned arm shaft 12 is provided with guide rollers 51 at opposite ends thereby to serve as guide members for the arm lift assembly 2 as the latter is moved horizontally by the carriage 1 toward and away from the center of the curing press, the guide rollers 51 being adapted, for example, to run on and along guide rails 52 which are mounted on side plates 52 of the base of the press. In FIG. 1, denoted at 54 is a coupled portion where the carriage 1 and arm lift assembly 2 are disengageably coupled with each other, and at 55 an auxiliary bracket which is attached to the beam 11a of the bridge member 11 of the arm lift assembly 2 and provided with slide rollers 13a.

According to the unloading apparatus of the invention shown in FIGS. 1 through 7, a cured tire Y is discharged in the following manner. Upon completion of the curing operation by the vulcanizing press, the movable upper mold section is opened and retracted upwardly, and the bladder is then pulled off the inner surface of the cured tire and stretched by the center mechanism of the press. Then, the lower ring is raised to open a clearance between the lower ring and the stationary lower mold, whereupon the carriage 1 which is in the receded position indicated by broken line in FIG. 1 is driven by the motor or other suitable drive means to advance toward the center of the curing press. At this time, the arm lift assembly 2 which is supported on the carriage 1 has the unloading arms 13 in horizontal positions, and the auxiliary cam plate 41 of the guide cam member 37 is in the raised position shown by the solid lines. Thus, as the carriage 1 is moved toward the center of the press, the guide rollers 51 at the opposite ends of the arm shaft 12 of the arm lift assembly 2 are caused to move forward on and along the guide rails 53 to receive a cured tire Y in a horizontal posture on the unloading arms 13 as indicated by the solid lines. In the next phase of operation, the drive cylinder 14 is actuated to extend out its piston rod 14a, moving therewith the slide 15 and sprocket wheel 16 to retract the chains 18 and 20 to thereby elevate the arm lift assembly 2, unloading arms 13 and tire Y altogether along the guide posts 8. At this time, the stopper 32 which is located between the unloading arms 13 is held in the upright position as shown in FIGS. 2, 4 and 5. As soon as the arm lift assembly 2 reaches its raised position clear of the bladder on the part of the curing press, the drive cylinder 25 is actuated to tilt the unloading arms 13 backward as indicated in the phantom lines in FIG. 1. While the arm lift assembly 2 is being elevated in this manner, the guide rollers 51 which are attached to the opposite ends of the arm shaft 12 are abutted against the auxiliary cam plates 40 at the upper ends of the guide cam members 37 but clear the auxiliary cam plates 40 by rocking the same about the pivoting shafts 43 against the actions of the springs 44 so that the arm lift assembly 2 can be elevated without any problems.

After actuating the drive cylinder 25 to turn the unloading arms 13 about the arm shaft 12 to assume the tilted-back position indicated in phantom lines in FIG. 1, the above-mentioned cylinder 14 which serves to elevate the arm lift assembly 2 is put in a free state without applying any pressure thereto, and the carriage 1 is receded from the position indicated by solid lines to the position shown in phantom lines in FIG. 1, thereby causing the guide rollers 51 at the opposite ends of the arm shaft 12 of the unloading arms 13 to ride onto the inclined slide surfaces 42 of the auxiliary cam plates 40, next onto the inclined slide surfaces 39 of the main cam plate 38 and then onto the inclined slide surfaces 46 of the auxiliary cam plates 41 which have been turned into the flat positions shown in phantom lines prior to the carriage retraction from the positions indicated by solid lines in FIG. 1. Under the guidance of the guide rollers 51, the arm lift assembly 2 is smoothly and lightly shifted as shown in phantom lines in FIG. 1, holding the cured tire Y on the unloading arms 13, while the guide rollers 51 smoothly ride onto the guide rails 53 through the curved guide surfaces 46a of the auxiliary cam plates 41, keeping the tire Y from incurring shocks as it is transferred to the rear discharge end of the press as shown. At the receded position, the stopper 32 is folded flat to permit the tire Y to advance smoothly and quietly through the slide rollers 13a at the rear end of the bridge member 11 for transfer, for example, onto a take-out conveyer. Upon completing discharge of the tire Y, the unloading arms 13 are returned to the horizontal positions in preparation for the next unloading operation.

Figure 8:
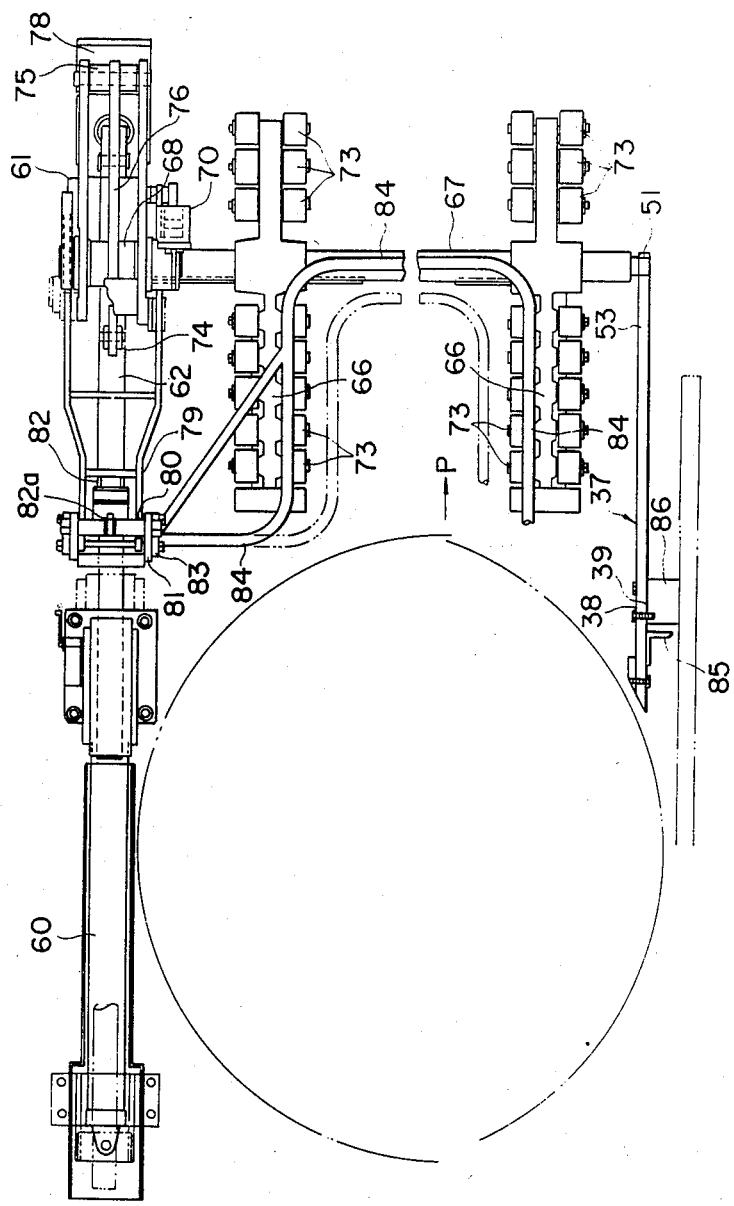
FIG. 8 is a plan view of a tire unloading apparatus of the present invention, intended specifically for a small- and medium-size tire vulcanizing press.
Figure 9:
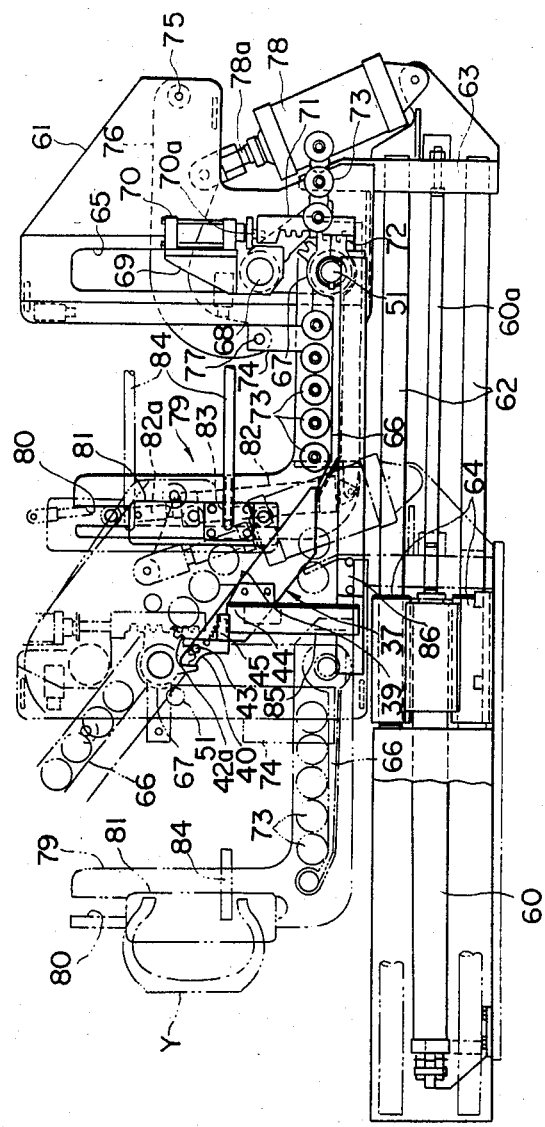
FIG. 9 is a front view of the tire unloading apparatus of FIG. 8 in operation.

FIGS. 8 and 9 show another embodiment of the present invention as applied to a press for shaping and curing relatively small tires. This embodiment employs a cantilever type arm shaft which is different from the arm shaft 12 of FIGS. 1 and 2 which is supported at both ends. An unloader advancing and retracting cylinder 60 is mounted through utilization of a space at one side of a tire vulcanizing press, (not shown) parallel with a tire discharging direction indicated by arrow P. The piston rod 60a of the cylinder 60 is coupled with a connecting member 63 with guide rods 62 for an unloader body 61, the guide rods 62 being slidably fitted in guide members 64 so that the unloader body 61 is moved linearly back and forth at one side of the curing press parallel with the tire discharging direction of arrow P when the piston rod 60a is stretched out and contracted by operation of the cylinder 60. An arm shaft 67 which supports thereon a pair of parallelly extending unloading arms 66 is vertically movably and rotatably supported in an elongated guide slot 65. A slide shaft 68 which is similarly supported in the elongated slot 65 at a position over the arm shaft 67 is liftable up and down with the latter through a hub or other coupling means which is not shown. The slide shaft 68 is provided with an arm stopper 69 and an arm tilting cylinder 70. A rack 71 which is attached to a piston rod 70a of the cylinder 70 is meshed with a drive gear 72 which is provided on one part of the arm shaft 67, so that the rack 71 is moved back and forth as the piston rod 70 is extended and contracted by operation of the cylinder 70, rotating the drive gear 72 in the forward or reverse direction to turn the unloading arms 66 into a horizontal or tilted position through rotation of the arm shaft 67.

A row of idle slide rollers 73 are provided on the upper side of each unloading arm 66 to ensure smooth sliding movement of the tire Y. For lifting the arm shaft 67 up and down and the accompanying slide shaft 68 within the elongated slot 65, a lift lever link 74 of substantially L-shape is projectingly attached to the arm shaft 67, and one end of a lift lever 76, which is rockably supported at the other end on the unloader body 61 through a pivoting shaft 75, is pivotally connected to one end of the lift lever link 74 through a pivoting shaft 77, connecting a middle portion of the lift lever 76 to a piston rod 78a of a lift cylinder 78 which is similarly mounted in position through utilization of the unloader body 61. The extension and retration of the piston rod 78a by operation of the cylinder 78 thus causes the lift lever 76 to rock back and forth about the pivoting shaft 75 to lift the lift lever link 75, up and down accordingly lifting or lowering the arm shaft 67 and slide shaft 68 in the elongated guide slot 65. Further, vertically movably received in an elongaged slot 80 in a bracket 79 which is erected at the fore end of the unloader body 61 is a lift bracket 82 which is connected to a piston rod 82a of a lift cylinder 82 and provided with a support means for supporting a base portion of a tire retaining arm 84. The just-mentioned tire retaining arm 84 is substantially of U-shape and extends over the paired unloading arms 66, engaging the tire Y in the manner as shown in FIG. 9.

In the above-described unloading apparatus according to the invention, idling guide rollers 51 are provided at axial ends of the unloading arms 67 (at the ends away from the unloader body 61) in a manner similar to the guide rollers 51 in the embodiment shown in FIGS. 1 and 2, in engagement with horizontal guide rails 53 which are mounted through utilization of the side base plates 52 of the press. A guide cam member 37 is mounted in a position above the guide rail 53 in the manner shown by means of an upright bracket 85 which is attached to one part of the guide rail 53. In this instance, the cam member 37 consists of a main cam plate 38 in the form of a band-like strip with an inclined slide surface 39 of a predetermined angle, and an auxiliary cam plate 40 which is rockably supported at the upper end of the main cam plate 38 by a pivoting shaft 43, a spring 44 and a stopper 45, without using the second auxiliary cam plate 41 as employed in the embodiment of FIGS. 1 and 2. Further, the auxiliary cam plate 40 also serves as a stopper mechanism of the arm shaft 67 in cooperation with the guide rollers 51, and is provided with a cam surface 42 including a surface for supporting the guide rollers 51 and an inclined surface contiguous to the inclined slide surface 39. In the particular embodiment shown, the guide rail 53 is fixed to the side plate 52 of the base by a mounting block 86.

In this embodiment, a cured tire Y is unloaded by the guide cam members 37 in the same manner as in the first embodiment of FIGS. 1 and 2. The unloading of the tire Y by the unloader body 61 is initiated after opening and retraction of the movable upper mold section, stripping of the bladder from the inner surface of the cured tire and extension of the bladder by the center forming mechanism, and formation of a clearance between the lower ring and the stationary lower mold section by elevation of the lower ring. Namely, the unloader 61 which is in the position indicated by the solid lines in FIGS. 8 and 9 is advanced toward the curing press upon operating the cylinder 60 to retract its piston rod 60, accompanying the guide rods 62 which are connected through the connecting portion 63. Thereafter, the unloading arms 66 and tire retaining arms 84 are advanced in a horizontal posture toward the center line X—X of the press under the guidance of the guide rollers 51 and guide rails 53 as indicated by the broken lines in FIG. 9. Then, the lift cylinder 78 is actuated to push out its piston rod 78a, turning the lift lever 76 upward about the pivoting shaft 75 along with the lift lever link 74. As a result, the arm shaft 67 and slide shaft 68 are lifted up straight along the lift guide slot 65 to raise the unloading arms 66 to a level for evading the bladder of curing press, while the tire retaining arm 84 is also lifted up due to elevation of the lift bracket 81 by operation of the cylinder 82 to support the cured tire Y. At the lifted position, the unloading arms 66 are turned into a tilted posture by the downstroke of the piston rod 70a of the cylinder 70 and the accompanying downward movement of the accompanying rack 71 which is in meshed engagement with the drive gear 72. At this time, the tire Y which is received on the two unloading arms 66 is smoothly delivered to the discharge side of the press without any shock occurring, through retraction of the unloader 61 by operation of the reciprocating cylinder 78, freeing of the cylinder 78, lowering of the arm shaft 67 under the guidance of guide rollers 51 along the inclined slide surface 39 of the guide cam member 37, and the succeeding guidance along the guide rails 53.

According to the present invention, the unloader is advanced in a horizontal posture toward the center of a tire vulcanizing press as exemplified in the foregoing embodiments, and a tire Y is securely received on a tire supporting member including the liftable and tiltable unloading arms 13 or 66. In unloading a tire by tilting and retracting the unloader, the provision of the guide cam members 37 which restrict the tilting and retracting postures of the unloader greatly contributes to the smooth unloading of tires in a state free of occurrence of shocks or deformations.

In comparison with the present invention, in the conventional tire unloaders which are adapted simply to tilt a tire unloading or supporting member to drop (or throw off) the tire utilizing its weight, it is possible to speed up the tire discharge by tilting the unloader to an acute angle, which however imposes a great shock to the tire when stopped, with the possibilities of causing damage or deformations to the tires as they are received by a stopper mechanism immediately after curing. Further, if the unloader is arranged to throw out a tire which is tilted to a dull angle, it becomes necessary to provide a large stopper mechanism in its path or to provide a long inclined discharge passage, giving rise to associated problems and requiring a large space. In a case where the unloader is adapted to lift up vertically a horizontally disposed tire to evade the center mechanism of the press and then discharge the tire by rearward horizontal movement, the unloading movement involves a number of steps and needs an extremely large space, disadvantageously increasing the size of the unloader and thus of the tire vulcanizing press as a whole.

In contrast to conventional tire loaders, according to the present invention, the tilted tire support member is moved in the discharging direction on and along inclined slide surfaces of guide cam members, so that it is possible to control the posture of the tire supporting member to an angle at which the tire can be discharged free of occurrence of shocks and reactions, by selecting the angle of inclination of the slide surfaces. Moreover, this is possible through a relatively short distance, the unloader releasing the tire softly in a shock-free and quiet manner. Consequently, the unloader has no possibility of imposing adverse effects on the shape of the tire immediately after curing, nor does it need a large space for the operation due to its compact construction. Further, there is no necessity for providing a special mechanism or control for varying the tilted posture of the unloader, since it can be attained simply by the provision of the guide cam members in fixed positions. The guide cam member can be applied to unloaders of various types, and is especially suitable for unloaders of large-sized heavy tires as well as medium and small-sized tires to facilitate centering on a post inflator or other machine in the subsequent stage, eliminating rim biting or other problems which have thus far been caused by centering failures in this sort of operation. Thus, the unloader of the present invention has a great value especially when applied to tire vulcanizing presses.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for unloading a cured tire from a tire vulcanizing press having a center forming mechanism, said apparatus comprising:
   a movable tire support member tiltably mounted on a liftable support member and for supporting said cured tire thereon;
   means for moving said movable tire support member horizontally toward and away from said center forming mechanism of said tire vulcanizing press and for receiving and unloading said cured tire;
   means for tilting said movable tire support member toward a tire discharging side of said press at a lifted position over said center forming mechanism; and
   a guide cam member mounted on said means for moving said movable tire support member for engaging said movable tire support member and for guiding said movable tire support member toward a lower tire discharge point in a predetermined tilted posture, said guide cam member including a first auxiliary cam plate connected thereto for selectively guiding movement of said movable tire support member.

2. An apparatus as set forth in claim 1, wherein said movable tire support member further comprises a vertically movable bridge member, an arm lifter mounted on said bridge, an arm shaft transversely extended on said arm lifter and a pair of arms supported on said arm shaft, and wherein said guide cam member is fixedly provided on each side of said arm lifter and engageable with opposite ends of said arm shaft to guide retracting movement of the tire carrying arms in said predetermined tilted posture.

3. An apparatus as set forth in claim 2, wherein said means for moving said tire support member further comprises:
   a carriage upon which said arm shaft, said arm lifter and said bridge member are mounted and which is reciprocably movable for moving said arms toward and away from a center portion of said tire vulcanizing press;
   a pair of guide posts erected on opposite side portions of said carriage; and
   means for vertically moving said bridge member along said pair of guide posts.

4. An apparatus as set forth in claim 3, further comprising a pair of guide rails wherein said carriage further comprises a wheeled motor-driven carriage movable toward and away from the center of said press on and along said pair of guide rails.

5. An apparatus as set forth in claim 3, further comprising:
   a plurality of slider members having guide rollers wherein said bridge member is slidably fitted on said guide posts through said sliders; and
   a chain and sprocket wheel mechanism for lifting said bridge member up and down.

6. An apparatus as set forth in claims 2 or 3, further comprising first and second fixed horizontal guide rails wherein said arm shaft further comprises a guide roller positioned at opposite ends thereof for running on said first and second fixed horizontal guide rails when in a lowered position, and wherein said guide cam member is provided with an inclined slide surface of a predetermined angle for engagement with said guide roller at said opposite ends of said arm shaft.

7. An apparatus as set forth in claim 2, wherein said arms further comprise a row of idle slide rollers positioned on an upper tire-receiving side thereof.

8. An apparatus as set forth in claim 7, further comprising stopper means retractably projected in the vicinity of rear end portions of said arms of restricting free movement of said cured tire received on said arms.

9. An apparatus as set forth in claims 1 or 2, wherein said guide cam member further comprises a main cam plate substantially of a right-angled triangular shape having a first inclined slide surface of a predetermined angle and a second auxiliary cam plate rockably mounted at the upper end of said main cam plate.

10. An apparatus as set forth in claim 2, further comprising a frame-like body upon which said arms and arm shaft are tiltably and liftably supported and wherein said frame-like body is reciprocably movable parallel with the tire discharging direction for advancing and retracting said arms relative to said center forming mechanism of said tire vulcanizing press.

11. An apparatus as set forth in claim 10, further comprising cylinder means for reciprocatingly driving said body wherein said cylinder is provided on one side of said press, said body having an upright bracket with an elongated slot formed therein wherein said arm shaft is rotatably and liftably supported in said elongated slot in said upright bracket of said body.

12. An apparatus as set forth in claims 10 or 11, wherein said guide cam member further comprises a main cam plate in the form of a right-angled triangle with an inclined slide surface of a predetermined angle of inclination, and an auxiliary cam plate rockably attached to the upper end of said main cam plate.

13. An apparatus as set forth in claims 10 or 11, wherein said arms further comprise a row of idle slide rollers positioned on an upper tire-receiving side thereof.

14. An apparatus as set forth in claim 13, further comprising tire retaining means engageable with a cured tire received on said arms for restricting free movement of said tire.

15. An apparatus as set forth in claims 10 or 11, further comprising a fixed horizontal guide rail wherein said arm shaft is connected to said body at a first end thereof and which further comprises a guide roller positioned at a second end thereof for engagement with said fixed horizontal guide rail when said arm shaft is in a lowered position.

* * * * *